M. P KELLY.
VEHICLE WHEEL.
APPLICATION FILED AUG. 2, 1915.
1,155,582.
Patented Oct. 5, 1915.
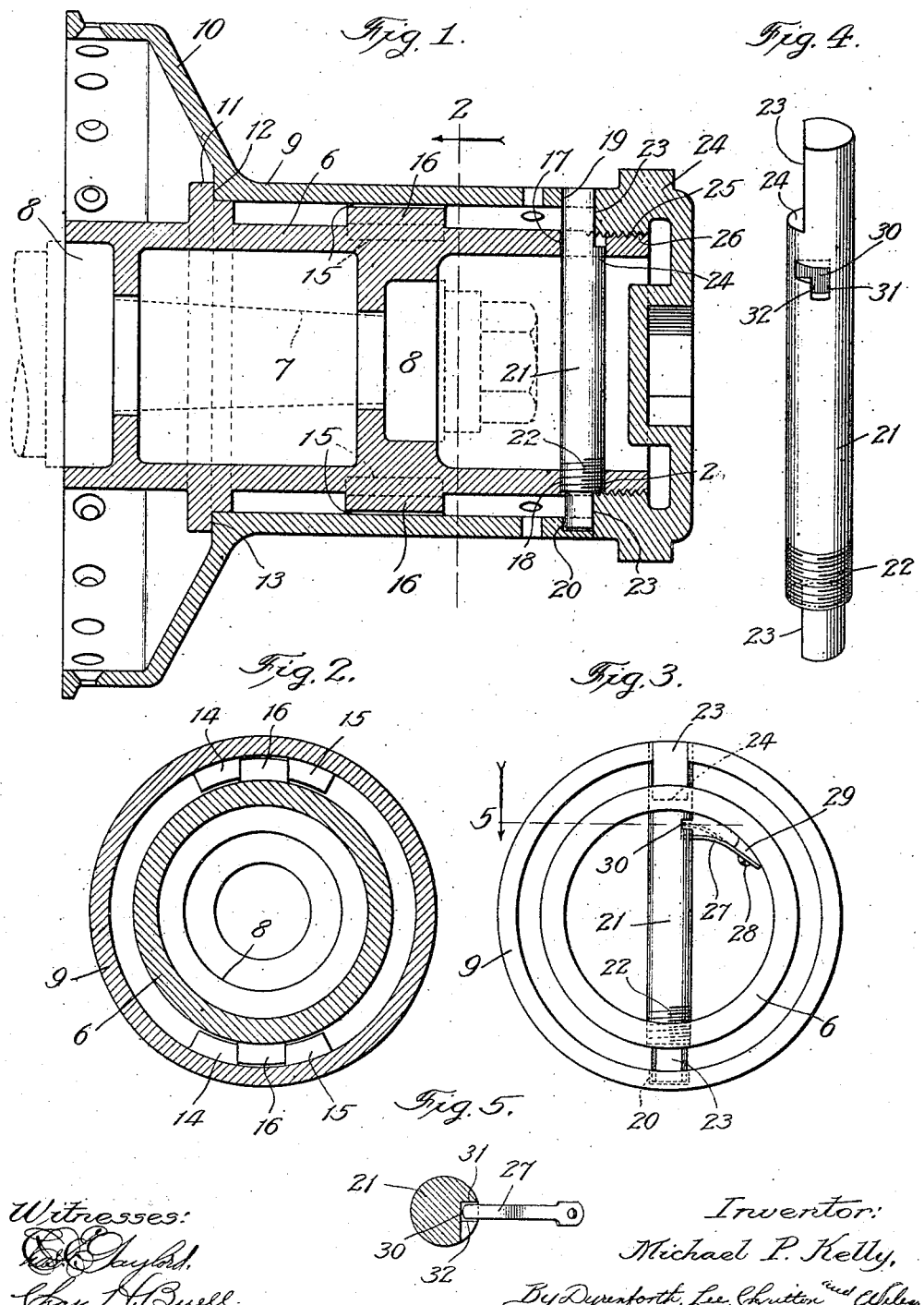

UNITED STATES PATENT OFFICE.

MICHAEL P. KELLY, OF CHICAGO, ILLINOIS.

VEHICLE-WHEEL.

1,155,582.     Specification of Letters Patent.     Patented Oct. 5, 1915.

Application filed August 2, 1915. Serial No. 43,212.

*To all whom it may concern:*

Be it known that I, MICHAEL P. KELLY, a citizen of the United States, residing at Chicago, in the county of Cook and State of Illinois, have invented a new and useful Improvement in Vehicle-Wheels, of which the following is a specification.

My invention relates more particularly to improvement in wheels of the type involving an inner hub member adapted to be either fixed on a rotating shaft or journaled on a fixed shaft, and an outer hub member adapted to telescope with the inner hub member and be held against rotation thereon when said hub members are telescoped.

My object, generally stated, is to provide a novel, simple and economical construction of demountable vehicle wheel of the type above referred to, the outer hub member of which may be readily removed from and replaced on the inner hub member and be held securely in position on the latter without danger of separation therefrom when the wheel is in use.

Referring to the accompanying drawings, Figure 1 is a view in longitudinal sectional elevation of a demountable wheel construction embodying my invention. Fig. 2 is a section taken at the line 2 on Fig. 1 and viewed in the direction of the arrow. Fig. 3 is an end view of the construction shown in Fig. 1 with the hub-cap removed. Fig. 4 is a perspective view of the pin employed for preventing displacement of the hub members in a longitudinal direction; and Fig. 5, an enlarged sectional view taken at the line 5 on Fig. 3 and viewed in the direction of the arrow showing a detail of the pin and spring mechanism employed.

The inner hub member of the wheel construction is represented at 6, in the construction illustrated this hub member being hollow and having journal connection with a shaft 7 on ball bearings 8 whereby the inner hub member is adapted to rotate on the axle 7. As stated above, the invention also applies to structures in which the inner hub member is fixed on a rotating axle, and it is therefore to be understood that applicant does not intend to limit his invention to a structure wherein the inner hub member rotates on a fixed axle.

The outer hub member is represented at 9, this member which is hollow, being provided at its inner end with an enlargement 10 at which the inner ends of the spokes at one side of the wheel would be connected in accordance with common practice. The inner end of the hub member 6 is provided about its periphery with a continuous flange 11 shouldered as represented at 12, and against which shoulder the portion 13 of the outer hub member 9 abuts when these hub members are in telescoped condition as represented in Fig. 1.

The hub member 9 is held to the hub member 6 against independent rotation, by means of interlocking faces on these hub members which are carried into operative relation upon telescoping the outer with the inner hub member. These interlocking faces are, in the construction illustrated, provided by the spaced pairs of lugs 14 and 15 and lugs 16, the lugs 14 and 15 being provided on the inner periphery of the outer hub member 9 and the lugs 16 on the outer periphery of the inner hub member 6. The lugs just referred to are so positioned and proportioned that the lugs 16 will snugly fit into the spaces between the pairs of lugs 14 and 15 and will hold the outer hub member against rotation on the inner hub member, when these hub members are telescoped as shown in Fig. 1.

The inner hub member 6 contains, adjacent its outer end, registering diametrically opposed circular openings 17 and 18 which register respectively with an opening 19 in the outer hub member 9 and a recess 20 in the latter diametrically opposing the opening 19. A pin 21 extends through the openings in said inner and outer hub members and into the recess 20, this pin by preference screwing at a threaded portion 22 thereof into similar threads provided in the wall of the opening 18, and being readily removable and replaceable to permit the hub members 6 and 9 to be separated when desired. The ends of the pin 21 are cut partly away, as illustrated at 23, to provide shoulders which latter extend flush with the outer end of the outer hub 9, the opening 19 and recess 20, which are generally circular, opening through the outer extremity of this hub-member, and screwing up against these reduced portions of the pin, is a hub-cap 24 in the form of a nut which screws at the threads 25 upon the threaded outer end 26 of the inner hub member 6, it being understood from the foregoing description that when the hub-cap 24 is screwed into place as stated and as shown in Fig. 1, the pin 21 cannot turn and as long as the hub-cap is in the position stated this pin is positively prevented from becoming displaced.

In addition to the described holding means for the pin I provide a spring 27 secured at one end, as indicated at 28, to a lug 29 on the inner surface of the hub member 6, one end of this spring being free to be flexed, and the connection 28 being preferably a pivotal one. The outer free end of this spring coöperates with a recess 30 in the pin 21. This recess is preferably formed as shown with an extension 31 of less width than the width of the body of the recess 30, to afford a shoulder 32. After the pin 21 has been positioned as stated, in which position the recess 30 will oppose the spring 27, the operator deflects the free end of the spring 27 in a direction away from the center of the hub radially thereof to cause the free end of the spring to enter the body portion of the recess 30, whereupon the spring is pressed backwardly swinging on the pivot 28 until it registers with the portion 31 of the recess, whereupon it drops into the latter and against the shoulder 32 which prevents accidental displacement of the spring. When it is desired to remove the pin the operator by any suitable means manipulates the spring 27 reversely to that just described, thus freeing it from engagement with the pin.

It will be readily understood from the foregoing description that a wheel constructed in accordance with my invention is not only simple and economical of construction and the removable parts thereof may be readily mounted on the relatively stationary part of the wheel and detached therefrom as desired, but the parts when assembled are held securely in position and danger of displacement and consequent injury is avoided.

What I claim as new and desire to secure by Letters Patent is—

1. In a vehicle wheel, the combination of an inner hub member and an outer hub member adapted to telescope with each other, means for holding said members against relative rotation when the latter are telescoped, said hub members having registering openings, a removable and replaceable pin extending through said openings for preventing said members from separating in a longitudinal direction, said pin having a portion of reduced diameter, and a member screwing upon an end of one of said hub members and engaging said pin at said portion.

2. In a vehicle wheel, the combination of an inner hub member and an outer hub member adapted to telescope with each other, means for holding said members against relative rotation when the latter are telescoped, said hub members having registering openings, a removable and replaceable pin extending through said openings for preventing said members from separating in a longitudinal direction, said pin having a shouldered portion, and a member screwing upon an end of one of said hub members and engaging said pin beyond said shoulder.

3. In a vehicle wheel, the combination of an inner hub member and an outer hub member adapted to telescope with each other, means for holding said members against relative rotation when the latter are telescoped, said hub members having registering openings, a removable and replaceable pin extending through said openings and screwing into one of the latter for preventing said members from separating in a longitudinal direction.

4. In a vehicle wheel, the combination of an inner hub member and an outer hub member adapted to telescope with each other, means for holding said members against relative rotation when the latter are telescoped, said hub members having registering openings, a removable and replaceable pin extending through said openings and screwing into one of the latter for preventing said members from separating in a longitudinal direction, said pin having a flat surface, and a member screwed upon one of said hub members and engaging said flat surface.

5. In a vehicle wheel, the combination of an inner hub member and an outer hub member adapted to telescope with each other, means for holding said members against relative rotation when the latter are telescoped, said hub members having registering openings, a removable and replaceable pin extending through said openings for preventing said members from separating in a longitudinal direction, said pin having a shouldered surface between its ends, and a spring member on one of said hub members adapted to be moved into and out of engagement with said shoulder to interlock therewith and prevent said pin from becoming displaced.

6. In a vehicle wheel, the combination of an inner hub member and an outer hub member adapted to telescope with each other, means for holding said members against relative rotation when the latter are telescoped, said hub members having registering openings, a removable and replaceable pin extending through said openings for preventing said members from separating in a longitudinal direction, said pin containing a recess in its side having an extension affording a shoulder, and a spring member on one of said hub members adapted to be moved into and out of said recess and into and out of engagement with said shoulder to interlock therewith and prevent said pin from becoming displaced.

MICHAEL P. KELLY.

Witnesses:
L. HEISLER,
O. C. AVISUS.

Copies of this patent may be obtained for five cents each, by addressing the "Commissioner of Patents, Washington, D. C."